United States Patent
Kuo et al.

(10) Patent No.: US 10,943,157 B2
(45) Date of Patent: Mar. 9, 2021

(54) PATTERN RECOGNITION METHOD OF AUTOANTIBODY IMMUNOFLUORESCENCE IMAGE

(71) Applicant: CHANG GUNG MEMORIAL HOSPITAL, LINKOU, Taoyuan (TW)

(72) Inventors: Chang-Fu Kuo, Taoyuan (TW); Chi-Hung Lin, Taoyuan (TW); Yi-Ling Chen, Taoyuan (TW); Meng-Jiun Chiou, Taoyuan (TW)

(73) Assignee: CHANG GUNG MEMORIAL HOSPITAL, LINKOU, Taoyuan (TW)

( * ) Notice: Subject to any disclaimer, the term of this patent is extended or adjusted under 35 U.S.C. 154(b) by 39 days.

(21) Appl. No.: 16/397,290

(22) Filed: Apr. 29, 2019

(65) Prior Publication Data
US 2019/0340473 A1 Nov. 7, 2019

(30) Foreign Application Priority Data
May 3, 2018 (TW) ................ 107115132

(51) Int. Cl.
| | |
|---|---|
| G06K 9/66 | (2006.01) |
| G06T 7/55 | (2017.01) |
| G06T 5/50 | (2006.01) |
| G06T 7/00 | (2017.01) |

(52) U.S. Cl.
CPC ........... *G06K 9/66* (2013.01); *G06T 5/50* (2013.01); *G06T 7/0012* (2013.01); *G06T 7/55* (2017.01)

(58) Field of Classification Search
CPC .... G06K 2209/05; G06K 9/6267; G06K 9/66; G06T 5/50; G06T 7/0012; G06T 7/55
See application file for complete search history.

(56) References Cited

U.S. PATENT DOCUMENTS

| | | | |
|---|---|---|---|
| 2006/0218010 A1* | 9/2006 | Michon ............ | G06F 19/3456 705/3 |
| 2017/0169567 A1* | 6/2017 | Chefd'hotel ....... | G06K 9/00127 |
| 2019/0205760 A1* | 7/2019 | Wiestler ............. | G06K 9/00127 |
| 2019/0371425 A1* | 12/2019 | Kuo ..................... | G06K 9/6273 |
| 2020/0202525 A1* | 6/2020 | Jarrard ................ | G01N 1/30 |

FOREIGN PATENT DOCUMENTS

| | | | | |
|---|---|---|---|---|
| CN | 106529605 A | * | 3/2017 | .......... G06K 9/6269 |
| CN | 108510004 A | * | 9/2018 | .......... G06K 9/6269 |
| WO | WO-0233415 A2 | * | 4/2002 | .......... G01N 33/564 |

OTHER PUBLICATIONS

Szegedy, C., Liu, W., Jia, Y., Sermanet, P., Reed, S., Anguelov, D., Erhan, D., Vanhoucke, V., and Rabinovich, A. Going deeper with convolutions. Technical report, arXiv:1409.4842 (Year: 2015).*

* cited by examiner

*Primary Examiner* — Ian L Lemieux
(74) *Attorney, Agent, or Firm* — WPAT, PC

(57) ABSTRACT

A pattern recognition method of the immunofluorescence images of autoantibody identification is disclosed. The method includes the following steps: inputting a plurality of original cell immunofluorescence images; conducting an operation of a plurality of convolutional neural networks by a processor, the plurality of convolutional neural networks include a convolution layer, a pooling layer and an inception layer for capturing the plurality of convolution features; conducting a judgment process to obtain the proportions of the antinuclear antibodies morphological patterns; and outputting the recognition results.

18 Claims, 8 Drawing Sheets

PATTERN RECOGNITION METHOD OF AUTOANTIBODY IMMUNOFLUORESCENCE IMAGE

CROSS-REFERENCE TO RELATED APPLICATION

This application claims priority of Taiwan patent application No. 107115132, filed on May 3, 2018, the content of which is incorporated herein in its entirety by reference.

BACKGROUND OF THE INVENTION

1. Field of the Invention

The present invention relates to a pattern recognition method of immunofluorescence images of autoantibody identification, particularly to a recognition method for analyzing original cell immunofluorescence images using an operation of convolutional neural networks (CNN), and recognizing immunofluorescence images are classified into various types of autoantibody patterns.

2. The Prior Art

Antinuclear antibodies (ANA) can be regarded as a group of autoantibodies that use various nuclear-related components in human cells as targets. These autoantibodies are present in a variety of immune diseases, such as rheumatoid arthritis, lupus erythematosus, scleroderma, xerosis, dermatomyositis, etc., and play a very important role in the diagnosis of pediatric rheumatic diseases. At present, the standard screening method for screening autoantibodies is to test by indirect immunofluorescence (IIF). If the result is greater than or equal to 1:80 after dilution, the readout can be recognized to be a meaningful positive result, that is, associated with a variety of autoimmune diseases. At the same time, the cell images obtained after screening by immunofluorescence can also be used to understand the morphology of autoantibodies. However, the above-mentioned interpretation or categorization is based on manual interpretation. In addition to the time-consuming labor of reproducible interpretation and concentration dilution, the use of immunofluorescence methods is becoming more common as the population of autoimmune diseases increases year by year. It is bound to increase the test year by year and cause a burden on manual interpretation.

In this regard, the use of machine learning technology to deal with the interpretation of immunofluorescent images seems to be a solution to solve the problems about labor costs of the manual interpretation and interpretation consistency. However, in order to use machine learning technology for interpretation, the original cell immunofluorescence images must be pre-processed first in the conventional techniques, including defined cutting of the cell range boundary, pixel blurring processing, etc., and the processed immunofluorescent images are classified and interpreted by machines. The above pre-processed procedure increases the interpretation step and reduces the interpretation efficiency of the recognition results of antinuclear antibodies. However, if the pre-processed procedure of the original cell immunofluorescence images is not performed, the accuracy of the recognition results cannot reach the required level. Therefore, the current methods for examining and recognizing antinuclear antibodies still cannot complete the interpretation of antinuclear antibodies using machine learning in a simplified and accurate manner.

In view of this, how to establish a machine learning model, which can directly read the original cell immunofluorescence images, capture the characteristics, effectively classify and recognize the nuclear antibodies, and improve the efficiency and accuracy of the recognition results, will be the goal that the medical industry hopes to achieve. Therefore, the inventors of the present invention have conceived and designed a recognition method of immunofluorescence images of autoantibodies, and the drawbacks have been improved in view of the lack of the prior art, thereby enhancing the industrial use and utilization.

SUMMARY OF THE INVENTION

In view of the above-mentioned problems of the prior art, the objective of the present invention is to provide a recognition method of immunofluorescence images of autoantibodies, so as to solve the problems that the automatic interpretation accuracy is too low and an additional pre-processed procedure for immunofluorescence images is required in the prior art.

A primary objective of the present invention is to provide a pattern recognition method of immunofluorescence images of autoantibody identification, comprising the following steps: inputting a plurality of original cell immunofluorescence images through an input device, converting the plurality of original cell immunofluorescence images into a plurality of three primary color layers, respectively; conducting an operation of a plurality of convolutional neural networks on the plurality of three primary color layers via a processor, wherein each of the plurality of convolutional neural networks comprises a convolution layer, a pooling layer and an inception layer for capturing a plurality of convolution features after the operation, followed by using the plurality of convolution features as input of next order of convolutional neural networks; conducting a recognition process via the processor, fully connecting the plurality of convolution features with a plurality of neurons, and recognizing proportions of the plurality of original cell immunofluorescence images to a plurality of antinuclear antibody patterns; and outputting recognition results of the plurality of original cell immunofluorescence images through an output device.

Preferably, the convolution layer comprises a trigger function, and the trigger function comprises a Sigmoid function, a Tan h function, a ReLU function, a PReLU function, an ArcTan function, an ELU function, a SoftPlus function, a Sinusoid function, a Sinc function, a Bent identity function, or a Gaussian function.

Preferably, the pooling layer comprises a max-pooling operation or a mean pool operation.

Preferably, the inception layer comprises a convolution operation and a max-pooling operation for different sizes of templates in a same layer of operation, and then data are cascaded.

Preferably, each of the plurality of antinuclear antibody patterns comprises a negative phenotype, a nuclear phenotype, a cytoplasmic phenotype, and a mitotic phenotype.

Preferably, the nuclear phenotype comprises a homogeneous pattern, a speckled pattern, a centromere pattern, a discrete nuclear dots pattern, a nucleolar pattern, a nuclear envelope pattern, and a pleomorphic pattern.

Preferably, the speckled pattern includes a dense fine speckled pattern, a fine speckled pattern, a large coarse speckled pattern, and a Topo I-like pattern.

Preferably, the discrete nuclear dots pattern includes a multiple nuclear dots pattern and a few nuclear dots pattern.

Preferably, the nucleolar pattern includes a homogeneous pattern, a clumpy pattern, and a punctate pattern.

Preferably, the nuclear envelope pattern includes a smooth pattern and a punctate pattern.

Preferably, the pleomorphic pattern includes a PCNA pattern and a CENP-F pattern.

Preferably, the cytoplasmic phenotype comprises a fibrillar pattern, a speckled pattern, an anti-mitochondrial antibody (AMA) pattern, a Golgi pattern, and a rods and rings pattern.

Preferably, the fibrillar pattern includes a linear pattern, a filamentous pattern, and a segmental pattern.

Preferably, the speckled pattern includes a discrete dots pattern, a dense fine speckled pattern, and a fine speckled pattern.

Preferably, the mitotic phenotype comprises a centrosome pattern, a spindle fibers pattern, an intercellular bridge pattern, and a mitotic chromosomal envelope pattern.

Preferably, the spindle fibers pattern includes a nuclear mitotic apparatus (NuMA) pattern.

Preferably, the plurality of original cell immunofluorescence images inputted are subjected to an operation of 10-layer convolutional neural networks to capture the plurality of convolution features.

Preferably, the convolution layer in each of the plurality of convolutional neural networks has a convolution kernel of a predetermined pixel size.

According to the above, the pattern recognition method of immunofluorescence images of autoantibody identification according to the present invention may have one or more of the following advantages:

(1) The pattern recognition method of immunofluorescence images of autoantibody identification can directly analyze the original cell immunofluorescence image, and does not need to perform the pre-processed step on the immunofluorescence images, thereby effectively improving the interpretation efficiency.

(2) The pattern recognition method of immunofluorescence images of autoantibody identification can automatically analyze and interpret the cell immunofluorescence image data through machine learning, without recognizing the antinuclear antibody types by manual interpretation, reducing the burden on inspectors and reducing the cost of the interpretation process.

(3) The pattern recognition method of immunofluorescence images of autoantibody identification can capture the deep features of the cell immunofluorescence images through the multi-layer convolutional neural network operation, so that the interpretation result is more accurate and the accuracy rate of the recognition is improved.

BRIEF DESCRIPTION OF THE DRAWINGS

The following drawings form part of the present specification and are included here to further demonstrate some aspects of the present invention, which can be better understood by reference to one or more of these drawings, in combination with the detailed description of the embodiments presented herein.

DETAILED DESCRIPTION OF THE PREFERRED EMBODIMENT

In the following detailed description of the embodiments of the present invention, reference is made to the accompanying drawings, which are shown to illustrate the specific embodiments in which the present disclosure may be practiced. These embodiments are provided to enable those skilled in the art to practice the present disclosure. It is understood that other embodiments may be used and that changes can be made to the embodiments without departing from the scope of the present invention. The following description is therefore not to be considered as limiting the scope of the present invention.

Figure 1:
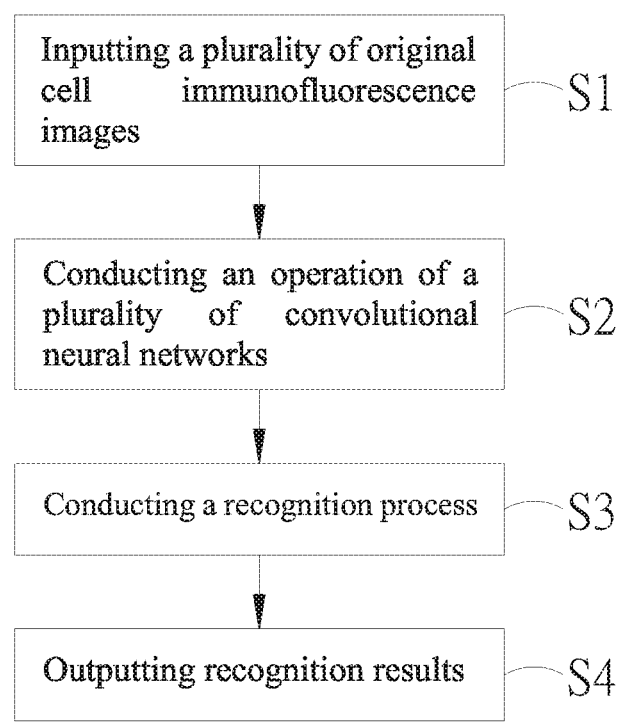
FIG. 1 is a flow chart showing a pattern recognition method of immunofluorescence images of autoantibody identification according to an embodiment of the present invention.

Referring to FIG. 1, which is a flow chart showing a pattern recognition method of immunofluorescence images of autoantibody identification according to an embodiment of the present invention. As shown in FIG. 1, the pattern recognition method of immunofluorescence images of autoantibody identification comprises the following steps (S1 to S4):

Step S1: Inputting a plurality of original cell immunofluorescence images. The original immunofluorescence images produced by the immunofluorescence examination can be input into the system of analysis through an input device. The input device herein can be a shooting or capturing device, such as a camera, collecting the image of the examination, or transmitting and receiving the files of the original cell immunofluorescence images using a computer interface or a network interface, and storing the files in a storage device, such as in the memory of a computer or the database of a server. At the same time, the original cell immunofluorescence images are further converted into layers of three primary colors (red, green, and blue) through the image conversion software as input data for subsequent machine learning. Compared with the prior art that is necessary to outline the cell appearance in the immunofluorescence images to analyze the differentiated cells, the original immunofluorescence images are used as input data, and no additional pre-processed step is needed, thereby effectively improving the efficiency of analysis.

Step S2: Conducting an operation of a plurality of convolutional neural networks. After the input of the original cell immunofluorescence images, the pre-processed procedures such as cutting the cell boundary or judging the outer edges of cells are not required, and the converted original cell immunofluorescence images of the three primary color layers are directly subjected to the operation of convolutional neural networks. The convolutional neural network herein comprises operations of a convolution layer, a pooling layer, and an inception layer. In this embodiment, the original cell immunofluorescence images can be used to discover deeper features in the immunofluorescence images through multiple operations of convolutional neural network, so that the results of subsequent judgment or classification are more accurate. The operation criteria of the convolution layer, the pooling layer and the inception layer may be stored in the computer or server for analysis, and the processor in the computer or the server executes instructions to perform operations in each layer. The processor herein comprises a central processing unit, a microprocessor, a multi-core processor, etc. The contents of each layer operation will be described separately below.

First, the convolution layer is a convolution kernel $k_{ij}^l$ of a predetermined size, convolving the feature data $x_i^{l-1}$ of the previous layer and adding the deviation value $b_j^l$, and the feature data after convolution, as shown in the following equation (1), is obtained. The convolution operation moves the convolution kernel through the sliding manner on the data, and calculates the inner product to obtain new features. The size of the convolution kernel can be designed in different sizes in operations of convolutional neural networks at different stages, so that the convolutions at different stages can be different.

$$z_j^l = \Sigma_i x_i^{l-1} \times k_{ij}^l + b_j^l \qquad (1)$$

Figure 2:
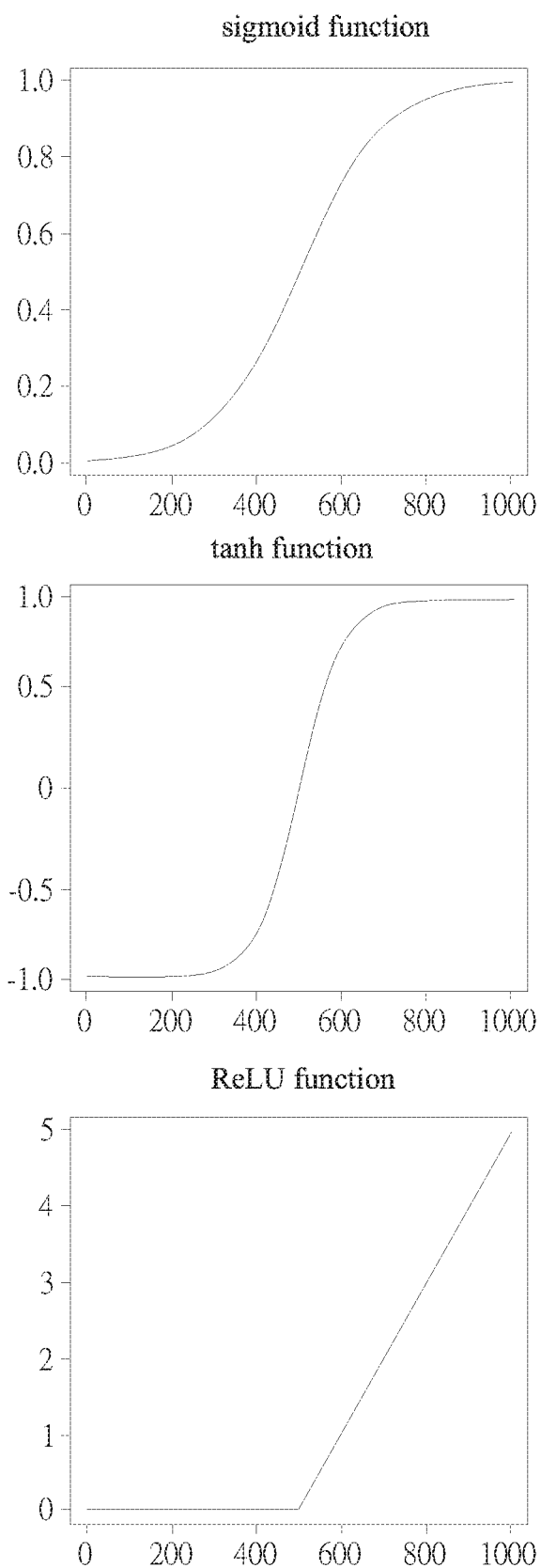
FIG. 2 is a schematic diagram of a trigger function of an embodiment of the present invention.

Then, the convolution layer comprises an activation layer, using the trigger function $f$ to convert the convolution features $z_j^l$ in the previous layer into $x_j^l = f(z_j^l)$. Using the trigger function is to use a nonlinear function to avoid the linear combination of the input in the previous layer as the output in this layer. Common trigger functions comprise Sigmoid functions, Tan h functions, or ReLU functions. Referring to FIG. 2, which is a schematic diagram of a trigger function of an embodiment of the present invention. As shown in FIG. 2, the Sigmoid function is shown in equation (2), and its output map is between 0 and 1. The Tan h function is shown in equation (3), which is centered at 0 and is distributed between −1 and 1. The ReLU function is shown in equation (4), and some of the neuron outputs are zero.

$$\text{sigmoid}(x) = \frac{1}{1+e^{-x}} \qquad (2)$$

$$\tanh(x) = \frac{2}{1+e^{-2x}} - 1 \qquad (3)$$

$$ReLU(x) = \max(0, x) \qquad (4)$$

Among the above trigger functions, the Sigmoid function and the Tan h function have more and more layers in the hidden layer due to the development of deep learning. When the network model is used for back propagation, the gradient disappears easily, resulting in training problems. Therefore, in the present embodiment, the ReLU function is a preferable trigger function, and some of the neuron outputs are 0, making the network model sparser and reducing the phenomenon of over-fitting.

In addition to the above trigger function, the PReLU function, the ArcTan function, the ELU function, the SoftPlus function, the Sinusoid function, the Sinc function, the Bent identity function or the Gaussian function can also be used as the trigger function of the convolution layer. Among them, the PReLU function is shown in equation (5), which is an improvement of the ReLU function, and the learnable parameter a is added. The ArcTan function is shown in equation (6). The ELU function is similar to the PReLU function, adding a non-zero output to the negative input to prevent silent neurons from appearing and the reciprocal convergence is zero. The SoftPlus function returns any value greater than zero as shown in equation (7). The Sinusoid function, as shown in equation (8), forms a sinusoid with a range of −1 to 1. The Sinc function is shown in equation (9), which defines a value of 1 when x is zero. The Bent identity function, as shown in equation (10), allows nonlinear behavior and can return values on either side of 1. The Gaussian function is shown in equation (11), and the range is between 0 and 1. The above activation function may be used as a trigger function of the activation layer in the embodiment of the present invention, but it is not limited thereto in the present invention.

$$PReLU(x) = \max(0, x) + a \times \min(0, x) \qquad (5)$$

$$\arctan(x) = \frac{i}{2} \ln\left(\frac{i+x}{i-x}\right) \qquad (6)$$

$$Softplus(x) = \ln(1+e^x) \qquad (7)$$

$$Sinusoid(x) = \sin(x) \qquad (8)$$

$$Sinc(x) = \frac{\sin(x)}{x} \qquad (9)$$

$$\text{Bent Identity}(x) = \frac{\sqrt{x^2+1}-1}{2} + x \qquad (10)$$

$$Gaussian(x) = e^{-x^2} \qquad (11)$$

Next, the pooling layer operation comprises a max-pooling mode or a mean pool mode. The max-pooling is to return the maximum value of each feature map, and the mean pool is to return the average value of each feature map, that is, the feature after the convolution layer and the activation layer, becoming a new feature after being pooled. The operation of the pooling layer calculates the maximum or average value in the kernel through the non-overlapping 1×n kernel, and reduces the data dimension of the immunofluorescent image data by n times. In this embodiment, the dimension of the feature data reduction by the pooling layer may be different in the operation of convolutional neural networks at different stages. In addition, in some of the operation of convolutional neural networks, the convolved feature data can be recombined to avoid the data dimension being too reduced to present the actual features of immunofluorescent images.

Figure 3:
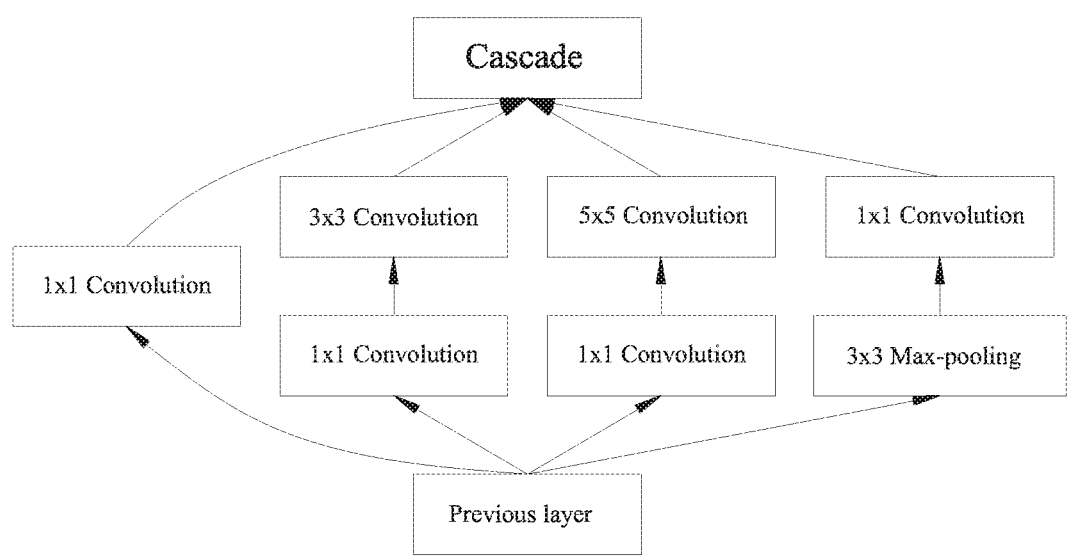
FIG. 3 is a schematic diagram of an inception layer of an embodiment of the present invention.

Finally, the inception layer operation uses a tree network architecture to increase the depth and width of the network model. Referring to FIG. 3, which is a schematic diagram of an inception layer of an embodiment of the present invention. As shown in FIG. 3, the feature data of the previous layer is concatenated with 1×1, 3×3, and 5×5 convolutions and 3×3 max-pooling, and finally cascaded, so that the inception layer can obtain different levels of features. However, in order to avoid excessive network computation, a 1×1 convolution is conducted before 3×3 and 5×5 convolution, reducing the number of input channels, increasing the depth of network analysis, but the amount of data computation is reduced, thereby improving the efficiency of the operation. In addition, a trigger function, such as the ReLU function, can be set after each convolution layer.

The above-mentioned feature extraction process of convolutional neural networks can perform multiple stages of convolutional neural network operations to the original cell immunofluorescence image content, and obtain a plurality of convolution features. These convolution features can be used as the input data of another convolutional neural network, and the operations of the convolution layer, the pooling layer, and the inception layer are conducted again. By using multiple convolutional neural network operations, deeper hidden features are found.

Figure 4:
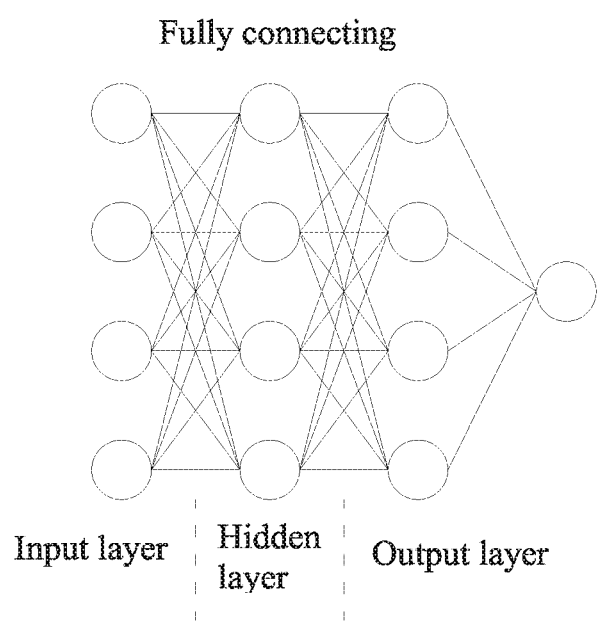
FIG. 4 is a schematic diagram of a multilayer sensing neural network according to an embodiment of the present invention.

Step S3: Conducting a recognition process. After the processor performs the above operation of feature extraction, the obtained plurality of convolution features can be fully connected with a plurality of neurons, and the proportions of the original cell immunofluorescence images to various autoantibodies are recognized. Referring to FIG. 4, which is a schematic diagram of a multilayer sensing neural network according to an embodiment of the present invention. As shown in FIG. 4, combined with two layers of fully-connected manner, each neuron in the operation layer is connected to all neurons in the next layer for operation. However, the embodiment is not limited thereto. In another embodiment, a dropout manner may also be used. By setting the probability p, a plurality of neurons in each hidden layer are not added to the operation, for example, the set probability p may be 0.5. The reason for using the dropout manner is to avoid the over-fitting phenomenon that the prediction result of training data is good, but the result of the test data is not good. Using the dropout manner to set the probability, and randomly training each epoch to correct the weight, the neurons in the hidden layer have a certain probability to disappear, so that each neuron may not be updated when the weight is updated, thereby preventing over-fitting. For example, the dropout manner can be selected during training, and the fully connected manner can be selected during actual testing.

The output layer of the multilayer sensing neural network can be classified and predicted using the softmax function, as shown in the following equation (12), as a probability of expressing the prediction result.

$$\text{softmax}(z)_j = \frac{e^{z_j}}{\sum_{k=1}^{K} e^{z_k}} \text{ for } j = 1, \ldots, K \quad (12)$$

Figure 5:
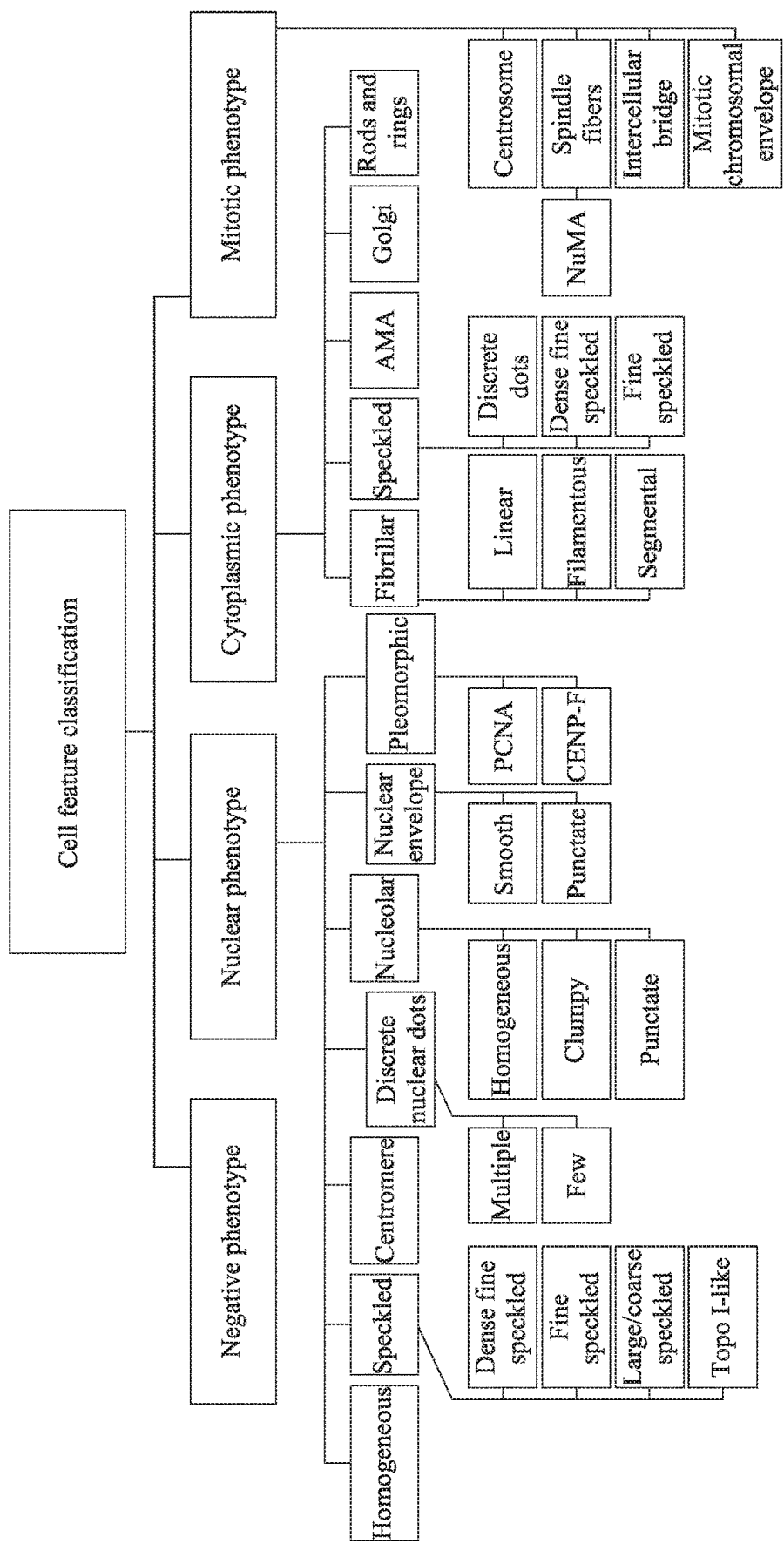
FIG. 5 is a schematic diagram showing the classification of autoantibody features according to an embodiment of the present invention.

For the classification of various autoantibody features, refer to the classification methods in International Consensus on ANA Patterns (ICAP). Referring to FIG. 5, which is a schematic diagram showing the classification of autoantibody features according to an embodiment of the present invention. As shown in FIG. 5, cell classification mainly includes negative, nuclear, cytoplasmic, and mitotic phenotypes. The negative phenotype represents that it is determined to have no antinuclear antibody characteristic morphology, and the nuclear phenotype may include a homogeneous pattern, a speckled pattern, a centromere pattern, a discrete nuclear dots pattern, a nucleolar pattern, a nuclear envelope pattern, and a pleomorphic pattern. The speckled pattern may include a dense fine speckled pattern, a fine speckled pattern, a large coarse speckled pattern, and a Topo I-like pattern. The discrete nuclear dots pattern may include a multiple nuclear dots pattern and a few nuclear dots pattern. The nucleolar pattern may include a homogeneous pattern, a clumpy pattern, and a punctate pattern. The nuclear envelope pattern may include a smooth pattern and a punctate pattern. The pleomorphic pattern may include a PCNA pattern and a CENP-F pattern. The cytoplasmic phenotype comprises a fibrillar pattern, a speckled pattern, an AMA pattern, a Golgi pattern, and a rods and rings pattern. The fibrillar pattern may include a linear pattern, a filamentous pattern, and a segmental pattern. The speckled pattern may include a discrete dots pattern, a dense fine speckled pattern, and a fine speckled pattern. The mitotic phenotype comprises a centrosome pattern, a spindle fibers pattern, an intercellular bridge pattern, and a mitotic chromosomal envelope pattern. The spindle fibers pattern may include a nuclear mitotic apparatus (NuMA) pattern.

Step S4: Outputting recognition results. After obtaining the proportions of the original cell immunofluorescence images belonging to the classification of various autoantibody features through the above operation steps, the recognition result may be stored in the storage device, and the recognition result is transmitted to the corresponding processing personnel through an output device. For example, the results are transmitted to the medical staff or medical examiner's computer, mobile phone, or tablet through wired or wireless network transmission, so that it can perform subsequent diagnosis or provide further instructions according to the recognition results.

Figure 6:
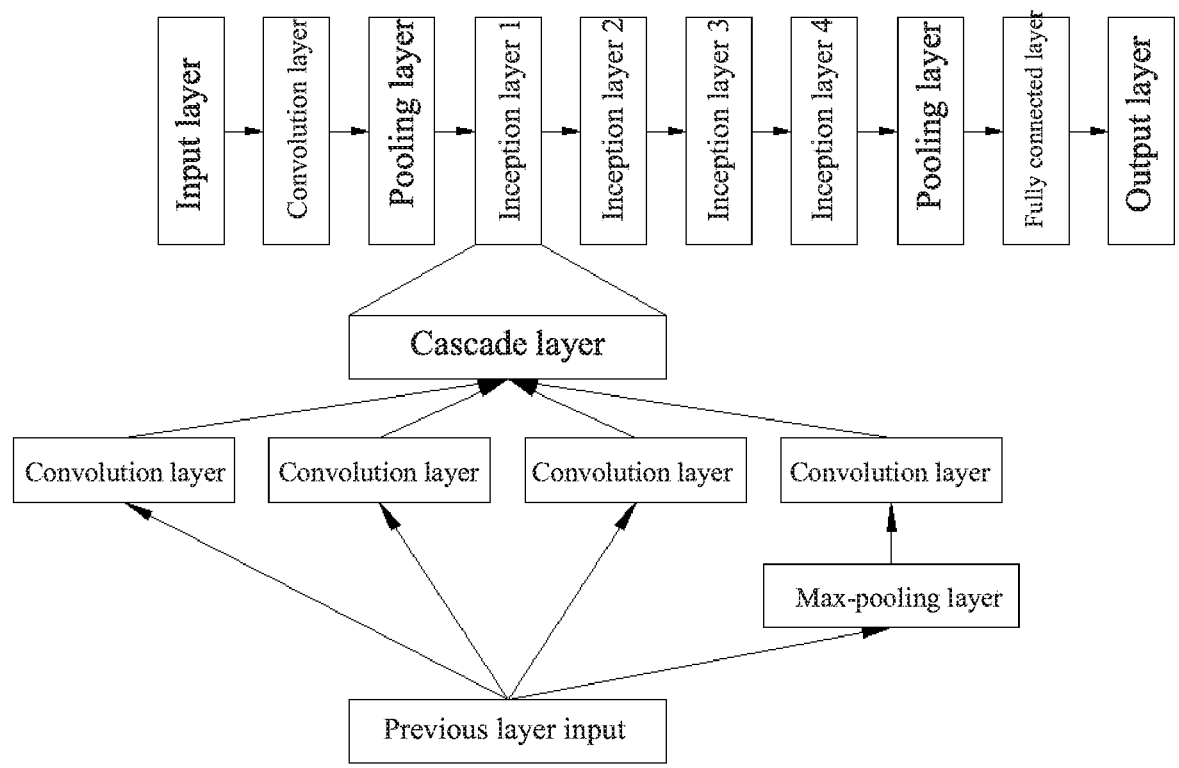
FIG. 6 is a schematic diagram showing a recognition method of immunofluorescence images of autoantibodies according to an embodiment of the present invention.

Referring to FIG. 6, which is a schematic diagram showing a recognition method of immunofluorescence images of autoantibodies according to an embodiment of the present invention. As shown in FIG. 6, in the present embodiment, a 10-layer convolutional neural network operation can be conducted corresponding to the above-described recognition step. In detail, after inputting the original cell immunofluorescence images from the input layer, the operations of the convolution layer and the pooling layer are conducted, followed by four times of the inception layer operation (inception layer 1 to inception layer 4), that is, after 16 times of convolutional neural network and finally through the pooling layer, a classification proportion belonging to various antinuclear antibody features through the fully connected layer is generated, and finally it is outputted through the output layer. The operation of each of the inception layers can also be divided into multiple convolution layers and then integrated through the cascade layer. The detailed content thereof is similar to the inception layer operation of the foregoing embodiment, so the description is not repeated. Overall, the optimal results can be achieved in this embodiment through a 10-layer convolutional neural network operation. Among them, the convolution kernel size and data dimension design of each layer can be the same in each convolutional neural network operation block or can be adjusted according to requirements. At the same time, the more layers can be used to discover deeper features, but the corresponding operation time will increase, thus reducing the efficiency of analysis. Therefore, the number of convolutional neural network operations conducted in this embodiment and the number of operation layers of each block can be adjusted according to requirements.

Figure 7:
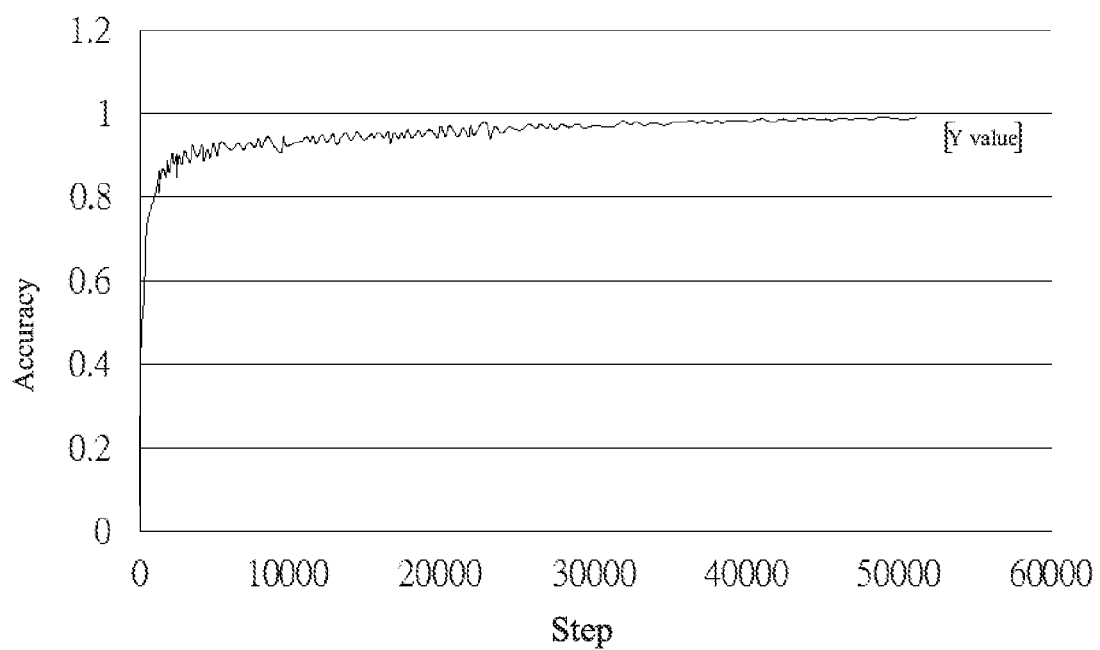
FIG. 7 is a schematic diagram showing the result of recognition of an autoantibody according to an embodiment of the present invention.
Figure 8:
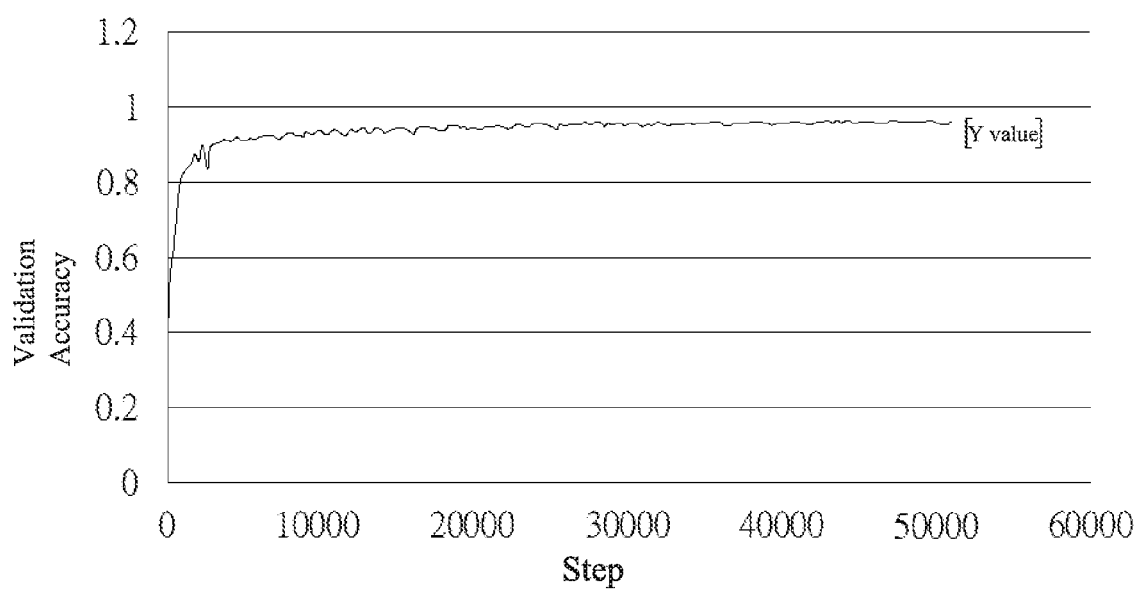
FIG. 8 is a schematic diagram showing the result of recognition of another autoantibody according to an embodiment of the present invention.

In the following, the data of 15,000 people obtained from the medical laboratory to examine autoantibodies are analyzed. These data have been recognized by the clinician. These data are used as input data of the pattern recognition method of immunofluorescence images of autoantibody identification of the present embodiment. After conducting a plurality of operations of convolutional neural networks, the recognition result is generated. After the recognition result is generated, it is compared with the recognized result, and the accuracy of the recognition is examined Among them, the network analysis is divided into two stages: the first stage is the training set, about 12,000 photos of people are taken as input. The characteristics of the photos are captured and then input into the convolutional neural network to improve the performance of the network training. The output result can be referred to FIG. 7. In the training set (the computer has learned data), the accuracy can be 99.45%. The second stage is the verification set. 3,000 photos of people are used as a test set to confirm whether the model results can still obtain good classification results in the pictures that have not been studied. The output result can be referred to FIG. 8. In the verification set (the computer has not learned data), the accuracy can still be 96.32%.

Compared with the recognition result of the present embodiment, in the prior art, the accuracy of recognition for a single cell can only be 80% via cell sorting. If it is for a whole immunofluorescence image recognition, including various types of cellular immunofluorescence images for recognition, the accuracy is only between 70% and 80%. From the above actual verification results, it can be shown that the pattern recognition method of autoantibodies in the present embodiment can have a recognition accuracy that is significantly better than that of the prior art.

Although the present invention has been described with reference to the preferred embodiments, it will be apparent to those skilled in the art that a variety of modifications and changes in form and detail may be made without departing from the scope of the present invention defined by the appended claims.

What is claimed is:

1. A pattern recognition method of immunofluorescence images of autoantibody identification, comprising the following steps:
   inputting a plurality of original cell immunofluorescence images through an input device, converting the plurality of original cell immunofluorescence images into a plurality of three primary color layers, respectively;
   conducting an operation of a plurality of convolutional neural networks on the plurality of three primary color layers via a processor, wherein each of the plurality of convolutional neural networks comprises a convolution layer, a pooling layer and an inception layer for capturing a plurality of convolution features after the operation, followed by using the plurality of convolution features as input of next order of the convolutional neural networks;
   conducting a recognition process via the processor, fully connecting the plurality of convolution features with a plurality of neurons, recognizing proportions of the plurality of original cell immunofluorescence images and comparing the proportions of the plurality of original cell immunofluorescence images to a plurality of antinuclear antibody patterns; and
   outputting recognition results of the plurality of original cell immunofluorescence images through an output device.

2. The pattern recognition method according to claim 1, wherein the convolution layer comprises a trigger function, and the trigger function comprises a Sigmoid function, a Tan h function, a ReLU function, a PReLU function, an ArcTan function, an ELU function, a SoftPlus function, a Sinusoid function, a Sinc function, a Bent identity function, or a Gaussian function.

3. The pattern recognition method according to claim 1, wherein the pooling layer comprises a max-pooling operation or a mean pool operation.

4. The pattern recognition method according to claim 1, wherein the inception layer comprises a convolution operation and a max-pooling operation for different sizes of templates in a same layer of operation, and then data are cascaded.

5. The pattern recognition method according to claim 1, wherein each of the plurality of antinuclear antibody patterns comprises a phenotype selected from the group consisting of: a negative phenotype, a nuclear phenotype, a cytoplasmic phenotype, a mitotic phenotype, and a combination thereof.

6. The pattern recognition method according to claim 5, wherein the nuclear phenotype comprises a homogeneous pattern, a speckled pattern, a centromere pattern, a discrete nuclear dots pattern, a nucleolar pattern, a nuclear envelope pattern, and a pleomorphic pattern.

7. The pattern recognition method according to claim 6, wherein the speckled pattern includes a dense fine speckled pattern, a fine speckled pattern, a large coarse speckled pattern, and a Topo I-like pattern.

8. The pattern recognition method according to claim 6, wherein the discrete nuclear dots pattern includes a multiple nuclear dots pattern and a few nuclear dots pattern.

9. The pattern recognition method according to claim 6, wherein the nucleolar pattern includes a homogeneous pattern, a clumpy pattern, and a punctate pattern.

10. The pattern recognition method according to claim 6, wherein the nuclear envelope pattern includes a smooth pattern and a punctate pattern.

11. The pattern recognition method according to claim 6, wherein the pleomorphic pattern includes a PCNA pattern and a CENP-F pattern.

12. The pattern recognition method according to claim 5, wherein the cytoplasmic phenotype comprises a fibrillar pattern, a speckled pattern, an anti-mitochondrial antibody (AMA) pattern, a Golgi pattern, and a rods and rings pattern.

13. The pattern recognition method according to claim 12, wherein the fibrillar pattern includes a linear pattern, a filamentous pattern, and a segmental pattern.

14. The pattern recognition method according to claim 12, wherein the speckled pattern includes a discrete dots pattern, a dense fine speckled pattern, and a fine speckled pattern.

15. The pattern recognition method according to claim 5, wherein the mitotic phenotype comprises a centrosome pattern, a spindle fibers pattern, an intercellular bridge pattern, and a mitotic chromosomal envelope pattern.

16. The pattern recognition method according to claim 15, wherein the spindle fibers pattern includes a nuclear mitotic apparatus (NuMA) pattern.

17. The pattern recognition method according to claim 1, wherein the plurality of original cell immunofluorescence images inputted are subjected to an operation of 10-layer convolutional neural networks to capture the plurality of convolution features.

18. The pattern recognition method according to claim 1, wherein the convolution layer in each of the plurality of convolutional neural networks has a convolution kernel of a predetermined pixel size.

* * * * *